(12) United States Patent
Enevoldsen et al.

(10) Patent No.: US 8,602,739 B2
(45) Date of Patent: Dec. 10, 2013

(54) WIND TURBINE ROTOR BLADE AND PITCH REGULATED WIND TURBINE

(75) Inventors: Peder Bay Enevoldsen, Vejle (DK); Søren Hjort, Brande (DK); Jesper Laursen, Silkeborg (DK); Anders Vangsgaard Nielsen, Silkeborg (DK); Rune Rubak, Silkeborg (DK)

(73) Assignee: Siemens Aktiengesellschaft, München (DE)

( * ) Notice: Subject to any disclaimer, the term of this patent is extended or adjusted under 35 U.S.C. 154(b) by 938 days.

(21) Appl. No.: 12/218,727

(22) Filed: Jul. 17, 2008

(65) Prior Publication Data

US 2009/0028718 A1 Jan. 29, 2009

(30) Foreign Application Priority Data

Jul. 20, 2007 (EP) .................................... 07014329

(51) Int. Cl.
| | |
|---|---|
| F03B 3/12 | (2006.01) |
| F03B 7/00 | (2006.01) |
| B63H 1/26 | (2006.01) |
| B63H 7/02 | (2006.01) |
| B64C 11/16 | (2006.01) |
| B64C 27/46 | (2006.01) |
| F01D 5/14 | (2006.01) |
| F03D 11/02 | (2006.01) |
| F04D 29/38 | (2006.01) |

(52) U.S. Cl.
USPC .................. 416/223 R; 416/242; 416/243

(58) Field of Classification Search
USPC ..................... 416/242, 243, 223 R
See application file for complete search history.

(56) References Cited

U.S. PATENT DOCUMENTS

2007/0110585 A1   5/2007   Bonnet

FOREIGN PATENT DOCUMENTS

| EP | 0947693 A2 | 10/1999 |
|---|---|---|
| EP | 0 954 701 B1 | 11/1999 |
| WO | 0116482 A1 | 3/2001 |
| WO | WO 0116482 A1 * | 3/2001 |
| WO | 2004099608 A1 | 11/2004 |
| WO | 2006122547 A1 | 11/2006 |
| WO | WO 2006122547 A1 * | 11/2006 |
| WO | 2007114698 A2 | 10/2007 |

* cited by examiner

Primary Examiner — Michael Lebentritt
Assistant Examiner — Aaron Dehne

(57) ABSTRACT

A wind turbine rotor blade with an airfoil profile having an upwind side, a downwind side is provided. A stall inducing device is located at the upwind side of the airfoil profile.

3 Claims, 3 Drawing Sheets

WIND TURBINE ROTOR BLADE AND PITCH REGULATED WIND TURBINE

CROSS REFERENCE TO RELATED APPLICATIONS

This application claims priority of European Patent Office application No. 07014329.2 EP filed Jul. 20, 2007, which is incorporated by reference herein in its entirety.

FIELD OF INVENTION

The present invention relates to a wind turbine rotor blade and to a pitch regulated wind turbine comprising a rotor with at least one rotor blade.

SUMMARY OF INVENTION

There are two different ways of regulating the power output of a wind turbine, namely pitch regulation and stall regulation.

In pitch regulated wind turbines the wind turbine power is regulated by setting an appropriate pitch angle for the rotor blades of the rotor. By setting the pitch angle, the machine can be operated with the optimum rotor speed in a wide range of wind speeds. However, wind turbines usually operate in a turbulent wind field. A pitch regulated wind turbine operating in such a turbulent wind field at high wind speed may experience negative lift on a part of the rotor blade's airfoil. In this case the wind load on the turbine blade will be opposite to the main wind direction. If this correlates with a positive lift load on the other two blades of a three bladed rotor very high yawing and tilting moments acting on the wind turbine structure can occur.

The issue of the very high tilting and yawing moments has been addressed hitherto by dimensioning the structure of wind turbine rotor blades so as to sustain the occurring loads.

In stall regulated wind turbines the limitation of power is regulated by setting an appropriate rotor speed. Setting the rotor speed is done by inducing a stall at the rotor blades. The pitch angles of the rotor blades are fixed in such machines. For stall regulated wind turbines it is known to use turbulators at the leading edge of a rotor blade's airfoil profile in order to reduce stall vibrations. Such turbulators are, for example, disclosed in EP 0 954 701 B1.

The occurrence of very high yawing and tilting moments is an issue of a pitch regulated wind turbine and not of a stall regulated wind turbine since rotor speed and pitch angle of the rotor blades at a given wind speed will differ according to the regulation mechanism used.

It is therefore an objective of the present invention to provide a wind turbine rotor blade which is suitable for overcoming the above-mentioned issue in a pitch regulated wind turbine. It is a further objective of the present invention to provide an improved pitch regulated wind turbine.

The first objective is solved by a wind turbine rotor blade and second objective is solved by a pitch regulated wind turbine according to the independent claims. The depending claims contain further developments of the invention.

An inventive wind turbine rotor blade comprises an airfoil profile having an upwind side and a downwind side. At the upwind side of the airfoil profile a stall inducing device is located.

As has already been mentioned in the introduction stall inducing devices on the leading edge or at the downwind side of a wind turbine rotor blade airfoil profile are already known from stall regulates wind turbines. In these cases the stall inducing devices are used to reduce the positive lift and thereby reduce the active power of a wind turbine. However, stall inducing devices on the upwind side of a wind turbine blade airfoil profile have different effects compared to the stall inducing devices at the leading edge or downwind side for power regulation in stall regulated wind turbines. By situating such stall inducing devices at the upwind side in pitch regulated wind turbines the maximum negative lift on the airfoil is reduced by disturbing the flow at the upwind side.

The present invention is based on the following observation:

A wind turbine operates in a turbulent wind field. This results in a different angle of attack of the relative wind at a given pitch angle as measured with respect to the chord of the profile. Different angles of attack, however, lead to different lifts on the airfoil. For usual operation conditions at moderate turbulence a pitch regulated turbine always operates in a linear part of the lift curve, i.e. the lift changes proportional to a change in the angle of attack. In some situations, however, a combination of rotor position and a strong shear in the wind field may result in an angle of attack outside this linear region. In these situations the loads on the turbine will be strongly related to the maximum lift and the minimum lift of the airfoil. Both the minimum and the maximum lift are achieved just before the airfoil stalls. In the situation with negative lift the flow separates on the upstream side of the airfoil. Therefore, by changing the absolute value of the minimum lift of an airfoil would decrease both the fatigue and the extreme loads on the turbine.

A suitable stall inducing device can have a triangular cross-section. In particular, the cross-section may be the cross-section of a scalene triangle or of an isosceles triangle. In the case of a scalene triangle the stall inducing device is advantageously located between 5% chord length and 30% chord length of the profile, preferably between 10% chord length and 20% chord length. In case the stall inducing device has the cross-section of an isosceles triangle it is advantageously located close to the leading edge, i.e. at below 5% chord length of the profile, in particular between 2% chord length and 5% chord length.

The stall inducing device of the inventive wind turbine rotor blade has the advantage of reducing the absolute value of the maximum negative lift but does not, to any appreciable degree, influence the operation characteristics of the blade profile in normal operation conditions. On the other hand, under operating conditions that can lead to a highly asymmetric loading it has a profound and positive influence on the loads.

An inventive pitch regulated wind turbine comprises a rotor with at least one inventive wind turbine rotor blade. In such a wind turbine the yawing and tilting moments on the wind turbine structure at high wind speeds can be reduced compared to a wind turbine without an inventive rotor blade.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
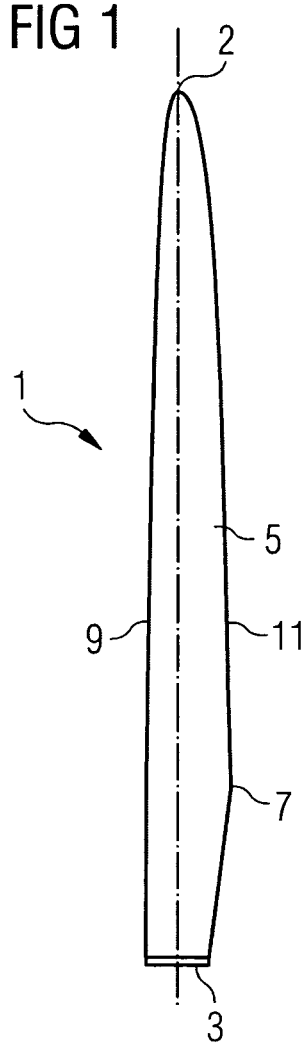
FIG. 1 shows a wind turbine rotor blade in a plain view on the plane defined by the blade's span and the blade chord.

FIG. 1 shows a wind turbine blade 1 as it is usually used in a three-blade rotor. However, the present invention shall not be limited to blades for three-blade rotors. In fact, it may also be implemented in other rotors like one-blade rotors or two-blade rotors, or in rotors with more than three blades.

The rotor blade 1 shown in FIG. 1 comprises a root portion 3 with a cylindrical profile and a tip 2 which forms the outermost part of the blade 1. The cylindrical profile of the root portion 3 serves to fix the blade 1 to a bearing of a rotor hub (not shown). The rotor blade 1 further comprises a so-called shoulder 7 which is defined as being the location of the blades maximum profile depth, i.e. its maximum chord length. The airfoil 5 extends along the so-called span (dash dotted line in FIG. 1) between the root portion 3 and the tip 2.

Figure 2:
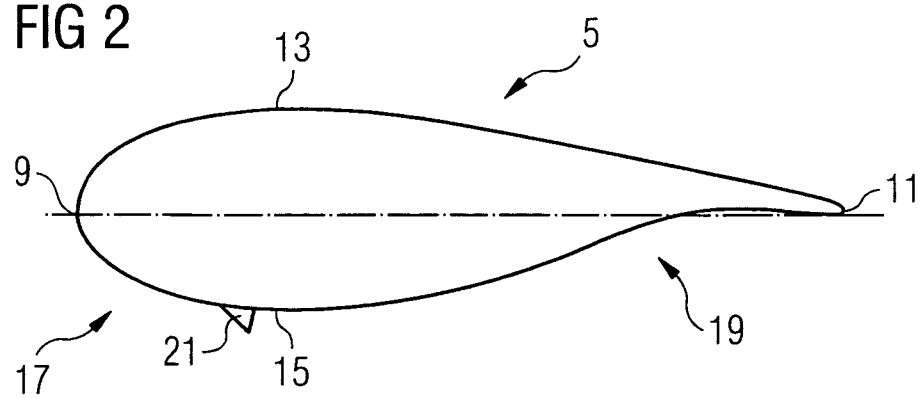
FIG. 2 shows a chord-wise section through the airfoil portion of the rotor blade according to a first embodiment of the invention.

A chord-wise cross-section through the rotor blade's airfoil 5 is shown in FIG. 2. The aerodynamic profile of the airfoil 5 shown in FIG. 2 comprises a convex suction side 13, which forms the downwind side of the profile, and a less convex pressure side 15, which forms the upwind side of the profile. The dash-dotted line extending from the blade's leading edge 9 to its trailing edge 11 shows the chord of the profile which is perpendicular to the span. Although the pressure side 15 comprises a convex section 17 and a concave section 19 in FIG. 2, it may be implemented without a concave section at all as long as the suction side 13 is more convex than the pressure side 15.

A stall inducing device 21 is located at the pressure side 15 at about 20% of the chord length as measured from the leading edge 9 of the profile of the airfoil 5. The stall inducing device 21 has a cross-section which resembles a scalene triangle and extends span-wise continuously or intermittently over a section of the airfoil 5.

Figure 3:
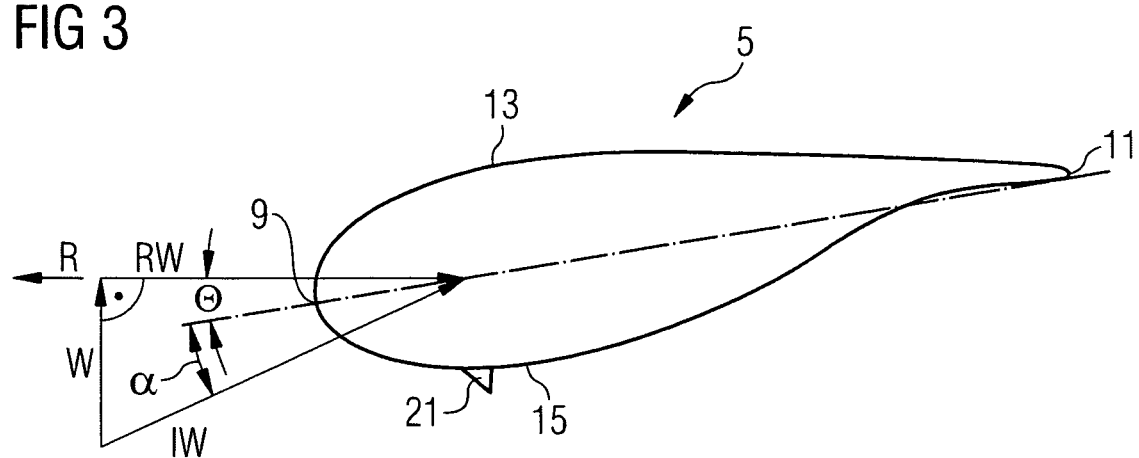
FIG. 3 shows the incident flow at a wind turbine rotor blade.

The wind conditions at an airfoil are shown in FIG. 3. The figure shows the wind direction W of the ambient wind and the rotation direction R of the rotor blade 5. As can be seen from the figure, the chord line of the profile and the rotation direction include an angle $\theta$ which is the pitch angle of the rotor blade. The pitch angle is set such that the rotor rotates with the optimum rotor speed and the power of the wind turbine is limited to a maximum power in a wind turbine with power regulation based on the pitch. Due to the rotation the rotor blade 5 experiences a relative wind which is indicated by arrow RW. The relative wind and the ambient wind sum up vectorially to the incident wind IW. The angle between the chord line and the direction of the incident wind IW is called the angle of attack $\alpha$.

In a pitch regulated wind turbine the angle of attack $\alpha$ will be reduced for reducing power output and increased for increasing power output of the wind turbine. In airfoil design the focus is usually on a high lift to drag ratio at angles of attack of about 2°.

The lift and the drag at very high and very low angles of attack is less important when the airfoils are used for aeroplane design. For a wind turbine, however, the characteristics at a low angle of attack are important for the loads of the turbine. Such low angles of attack can result from power reduction at high wind speeds.

Since a pitch regulated wind turbine operates in a turbulent wind field at high wind speeds a situation may arise when the pitch angle $\theta$ is set such that the angle of attack is close to 0° in which the angle of attack fluctuates around 0°. Such fluctuations may result in an angle of attack $\alpha$ which is negative, i.e. the wind attacks the airfoil 5 from the downwind side 13 rather than from the upwind side 15. In this case the rotor blade 1 will experience negative lift on a part of the airfoil 5 and the wind loads on the wind turbine blade 1 will be opposite to the main wind direction. If this correlates with positive lift loads on the other two blades the yawing and tilting moments on the structure of the wind turbine can become very high in a conventional wind turbine rotor blade.

In the inventive wind turbine rotor blade 1, however, the stall inducing device 21 will reduce the negative lift on the airfoil profile by inducing stall on the trailing edge side of the device 21. This is because behind the wedge-like geometry of the stall inducing device 21 a small recirculation region will appear. At a negative angle of attack $\alpha$ this region will tend to burst and hence trigger a larger stall on the upwind side 15 of the airfoil 5. On the other hand, when the angle of attack $\alpha$ is positive, i.e. the incident wind hits the blade on the upwind side 15, the stall inducing device 21 will have no substantial effect on the airflow so that the operation of the wind turbine rotor blade 1 is not negatively influenced under normal operation conditions.

Figure 4:
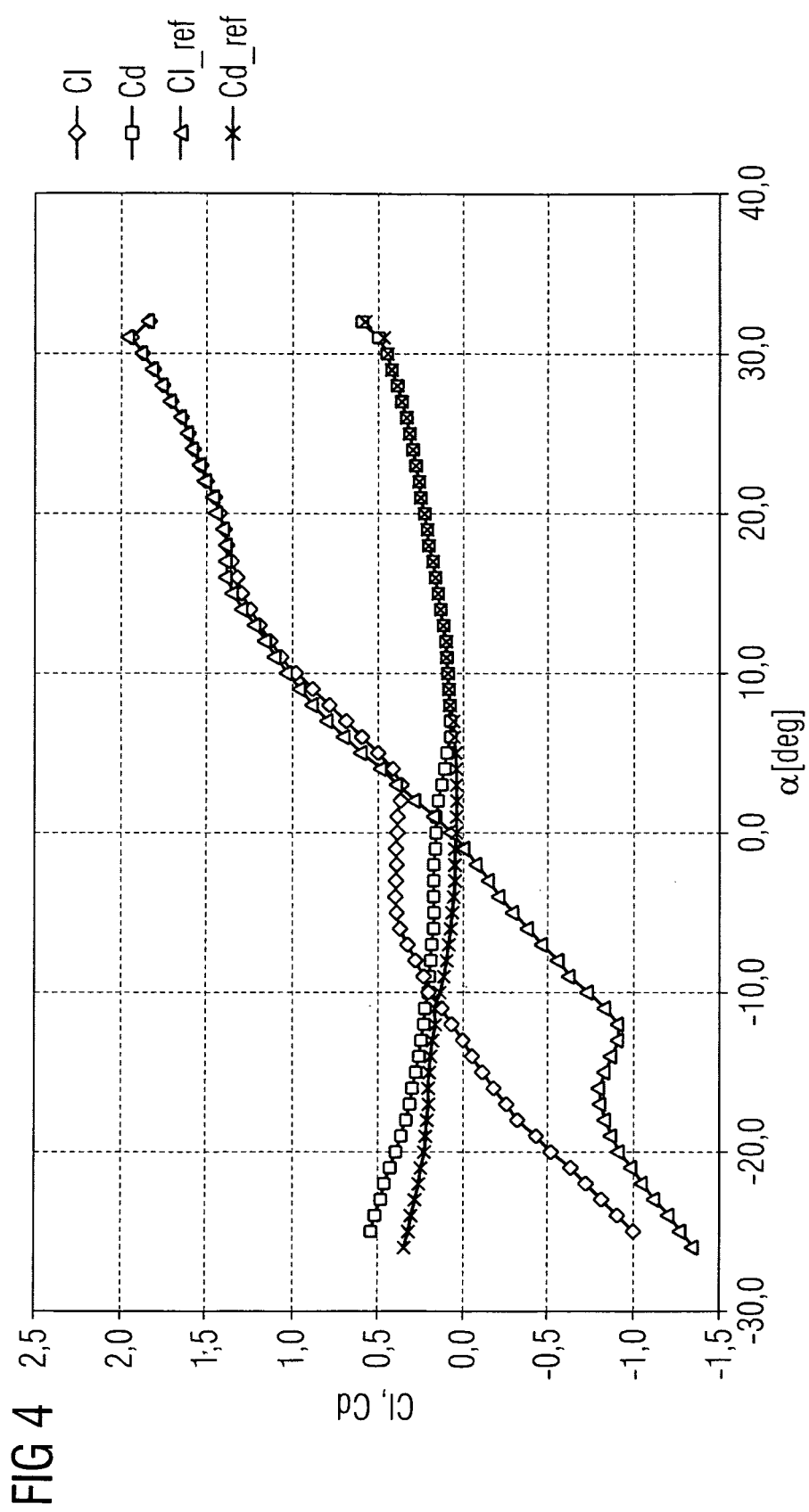
FIG. 4 shows measured values for the lift and the drag on an inventive wind turbine rotor blade compared to a conventional rotor blade.

The measured lift coefficient $C_l$ and the measured drag coefficient $C_d$ for an inventive wind turbine rotor blade 1 according to FIG. 2 are shown in FIG. 4 in dependence on the angle of attack $\alpha$. In order to be able to compare the inventive wind turbine blade 1 to a conventional wind turbine blade the lift coefficient $C_{l\_ref}$ and the drag coefficient $C_{d\_ref}$ of a wind turbine blade having the profile shown in FIG. 2 but without the stall inducing device 21 are also shown in the figure. The left side end and the right side end of the curves represent conditions where the airfoil stalls. Hence, both the minimum and the maximum lift are achieved just before the airfoil stalls.

FIG. 4 shows that at angles of attack of 3° and higher the lift coefficients $C_l$, $C_{l\_ref}$ for the rotor blades with and without the stall inducing device 21 almost coincide. At normal operation conditions with a lift coefficient $C_l$ of about 0.6 to 1.2 the influence of the stall inducing device 21 is, therefore, not severe. The same is seen on the drag coefficient $C_d$. From about an angle of attack $\alpha$ of 5° upwards the drag coefficients $C_d$, $C_{d\_ref}$ of the blade with and without the stall inducing device almost coincide. Only below about 5° to 4° does the drag coefficient $C_d$ of the wind turbine rotor blade 1 with the stall inducing device 21 increase because of the stall on the upwind side 15 of the airfoil 5.

At angles of attack $\alpha$ below about +3° the lift coefficient $C_l$ of the inventive wind turbine rotor blade 1 is almost unchanged over a range of about 10°. From about $\alpha$=-7° the lift coefficient $C_l$ then falls continuously with decreasing angles of attack $\alpha$ and becomes negative at about -14°. The minimum lift coefficient $C_l$ for the inventive wind turbine rotor blade 1 is about -1.0. In contrast thereto, a wind turbine rotor blade without the stall inducing device 21 already reaches a negative lift coefficient $C_{l\_ref}$ at about -1° and has a minimum lift coefficient of about -1.4°. Hence, for angles of attack $\alpha$ lower than about +3° the lift coefficient $C_l$ of the inventive wind turbine rotor blade 1 is always higher than the lift coefficient $C_{l\_ref}$ of a wind turbine rotor blade without the stall inducing device 21 at the upwind side 15. This would decrease both the fatigue and the extreme loads on the wind turbine for negative angles of attack $\alpha$. As a consequence, a situation where a wind turbine blade 1 experiences negative lift on a part of the airfoil 5 while the other wind turbine rotor blades experience positive lift will not occur until a negative angle of attack α of −14° is reached. An operation at low angles of attack is therefore less prone to conditions which produce large yawing or tilting moments.

Shifting the minimum lift coefficient of the airfoil 5 to higher lift coefficients $C_l$ therefore decreases both the fatigue and the extreme loads of the turbine.

Figure 5:
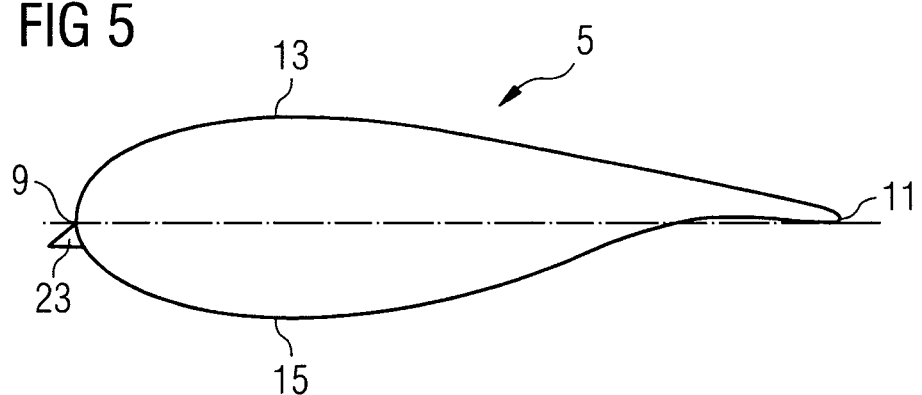
FIG. 5 shows a chord-wise section through the airfoil portion of a rotor blade according to a second embodiment of the invention.

A second embodiment of the inventive wind turbine blade is shown in FIG. 5 which shows the profile of the blade's airfoil portion 5. Elements of this embodiment which do not differ from the first embodiment are designated with the same reference numerals as in FIG. 2 and will not be described again to avoid repetition.

The difference of the embodiment shown in FIG. 5 from the first embodiment as shown in FIG. 2 lies in the location and the cross-section of the stall inducing device. In the second embodiment the stall inducing device 23 is located close to the leading edge 9 of the airfoil profile. Moreover, instead of having a cross-section which resembles a scalene triangle the stall inducing device 23 of the second embodiment has a cross-section which resembles an isosceles triangle. The location of the triangle is below 5% chord length as measured from the leading edge 9 and, in the present embodiment, at about 2% chord length.

Although two particular embodiments of the inventive wind turbine rotor blade have been described which resemble two extremes in cross-section and location of the stall inducing devices 21, 23 those skilled in the art will appreciate that any intermediate location of a stall inducing device between the locations shown in the embodiments will be suitable to implement the invention. As the location of the stall inducing device is shifted towards greater chord length, the cross-section of the stall inducing device gradually changes from an isosceles triangle, as shown with respect to the second embodiment, to a scalene triangle, as shown with respect to the first embodiment.

While in the state of the art the issue of occasionally high asymmetric loads on the wind turbine structure has generally been addressed by dimensioning the structure so as to sustain the highest predictive loads, the present invention allows for releasing the restrictions on dimensioning the turbine structure. This means less heavy designs can be realised compared to those designs which take high asymmetric loads into account by dimensioning the structure.

The invention claimed is:

1. A wind turbine rotor blade, comprising:
   an airfoil profile having an upwind side and a downwind side; and
   a stall inducing device located at the upwind side of the airfoil profile, wherein a chord-wise cross-section of the stall including device comprises an isosceles triangle, wherein the stall including device is located close to the leading edge of the airfoil profile less than 5% chord length of the airfoil from the leading edge.

2. The wind turbine rotor blade as claimed in claim 1, wherein the stall inducing device is located between 2% chord length and 5% chord length.

3. A pitch regulated wind turbine, comprising:
   a rotor with at least one wind turbine rotor blade according to claim 1.

* * * * *